United States Patent
Yu

(10) Patent No.: US 7,536,285 B2
(45) Date of Patent: May 19, 2009

(54) ODD TIMES REFINED QUADRILATERAL MESH FOR LEVEL SET

(75) Inventor: Jiun-Der Yu, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 358 days.

(21) Appl. No.: 11/464,374

(22) Filed: Aug. 14, 2006

(65) Prior Publication Data
US 2008/0126046 A1   May 29, 2008

(51) Int. Cl.
  G06F 17/50    (2006.01)
(52) U.S. Cl. .................. 703/2; 703/6; 700/281
(58) Field of Classification Search ........... 703/2, 703/6, 9; 700/281
  See application file for complete search history.

(56) References Cited

U.S. PATENT DOCUMENTS

| | | | |
|---|---|---|---|
| 4,797,842 A | 1/1989 | Nackman et al. | |
| 5,459,498 A | 10/1995 | Seccombe et al. | |
| 5,657,061 A | 8/1997 | Seccombe et al. | |
| 5,989,445 A | 11/1999 | Wise et al. | |
| 6,096,088 A * | 8/2000 | Yu et al. | 703/9 |
| 6,096,839 A * | 8/2000 | Chinh et al. | 526/68 |
| 6,161,057 A | 12/2000 | Nakano | |
| 6,179,402 B1 | 1/2001 | Suzuki et al. | |
| 6,257,143 B1 | 7/2001 | Iwasaki et al. | |
| 6,283,568 B1 | 9/2001 | Horii et al. | |
| 6,315,381 B1 | 11/2001 | Wade et al. | |
| 6,322,186 B1 | 11/2001 | Shimizu et al. | |
| 6,322,193 B1 | 11/2001 | Lian et al. | |
| 6,611,736 B1 * | 8/2003 | Waite et al. | 700/281 |
| 6,816,820 B1 * | 11/2004 | Friedl et al. | 703/2 |
| 7,024,342 B1 * | 4/2006 | Waite et al. | 703/6 |
| 2002/0042698 A1 * | 4/2002 | Meuris et al. | 703/2 |
| 2002/0046014 A1 | 4/2002 | Kennon | |
| 2002/0107676 A1 | 8/2002 | Davidson | |
| 2002/0177986 A1 | 11/2002 | Moeckel et al. | |
| 2003/0105614 A1 | 6/2003 | Langemyr et al. | |

(Continued)

OTHER PUBLICATIONS

"Projection Method for Viscous Incompressible Flow on Quadrilateral Grids", John B. Bell, et al., AIAA Journal, vol. 32, No. 10, Oct. 1994, pp. 1961-1969.

(Continued)

Primary Examiner—Thai Phan
(74) Attorney, Agent, or Firm—Daniel A. Ratoff

(57) ABSTRACT

A process for simulating the motion of a first fluid, a second fluid and an interface between the first fluid and the second fluid. The fluid velocities and pressures of the first and second fluids are calculated at a first set of nodes on a first mesh at a first time step, representative of movement of the first and second fluids at the first time step. The level set, which is representative of a position of the interface, is calculated at the first time step, at a second set of nodes on a second mesh. The second mesh is odd times finer than the first mesh. The new fluid velocities and pressures of the first and second fluids are calculated at the first set of nodes at a second time step, representative of new movement of the first and second fluids at a second time step. The new level set is calculated at the second set of nodes, representative of a new position of the interface at the second time step.

13 Claims, 8 Drawing Sheets

U.S. PATENT DOCUMENTS

| | | | |
|---|---|---|---|
| 2003/0182092 A1 | 9/2003 | Yu et al. | |
| 2004/0006450 A1 | 1/2004 | Hale | |
| 2004/0034514 A1 | 2/2004 | Langemyr et al. | |
| 2004/0181383 A1 | 9/2004 | Yu et al. | |
| 2004/0181384 A1 | 9/2004 | Yu | |
| 2005/0002589 A1 | 1/2005 | Walmsley et al. | |
| 2005/0024394 A1 | 2/2005 | Walmsley et al. | |
| 2005/0030565 A1 | 2/2005 | Walmsley et al. | |
| 2005/0114104 A1* | 5/2005 | Friedl et al. | 703/2 |
| 2005/0185024 A1 | 8/2005 | Eguchi | |
| 2005/0201896 A1 | 9/2005 | Peck | |
| 2005/0243117 A1 | 11/2005 | Yu | |
| 2005/0249438 A1 | 11/2005 | Lapstun et al. | |
| 2005/0264632 A1 | 12/2005 | Glass et al. | |
| 2005/0266582 A1 | 12/2005 | Modlin et al. | |
| 2005/0275815 A1 | 12/2005 | Silverbrook | |
| 2006/0028516 A1 | 2/2006 | Silverbrook | |
| 2006/0055758 A1 | 3/2006 | Silverbrook | |
| 2007/0239413 A1* | 10/2007 | Yu | 703/9 |

OTHER PUBLICATIONS

"A Second-Order Projection Method for the Incompressible Navier-Stokes Equations", John B. Bell, et al., Journal of Computational Physics, vol. 85, No. 2, Dec. 1989, pp. 257-283.

"Computing Minimal Surfaces via Level Set Curvature Flow", David L. Chopp, Mathematics Department, University of California, Berkeley, California, Journal of Computational Physics 106, pp. 77-91, 1993.

"Fronts Propagating with Curvature-Dependent Speed: Algorithms Based on Hamilton-Jacobi Formulations", Stanley Osher, Department of Mathematics, University of California, Los Angeles and James A. Sethian, Department of Mathematics, University of California, Berkeley, California, Journal of Computational Physics 79, pp. 12-49, 1988.

"A Level Set Approach for Computing Solutions to Incompressible Two-Phase Flow", Mark Sussman, et al., Department of Mathematics, University of California, Los Angeles, California, Journal of Computational Physics 114, pp. 146-159, 1994.

"A Projection Method for Incompressible Viscous Flow on Moving Quadrilateral Grids", David P. Trebotich, Department of Mechanical Engineering, University of California, Berkeley, California and Phillip Colella, Applied Numerical Algorithms Group, Lawrence Berkeley National Laboratory, Berkeley, California, Journal of Computational Physics 166, pp. 191-217, 2001.

"A Second-Order Projection Method for Variable-Density Flows", John B. Bell, et al., Lawrence Livermore National Laboratory, Livermore, California, Journal of Computational Physics 101, pp. 334-348, 1992.

"A Coupled Level Set Projection Method Applied to Ink Jet Simulation", Yu, et al., Interfaces and Free Boundaries, vol. 5, No. 4., 2003, pp. 459-482.

"A Meshfree Method for Incompressible Fluid Dynamics Problems," I. Tsukanov, V. Shapiro, S. Zhang, Apatial Automation Laboratory 2002.

"Modeling Quasi-static Crack Growth with the Extend Finite Element Method," N. Sukmar, J. H. Prevost, Part I: Computer Implementation International Journal of Solids and Structures 10 (2003) 7513-7537, May 30, 2003.

"Realistic Animation of Liquids", Nick Foster, Dimitri Metaxas, Jun. 3, 1996.

"Fast Marching Methods," SIAM Review, Sethian, J. A., vol. 41, No. 2, pp. 199-235, 1999, Society for Industrial and Applied Mathematics.

* cited by examiner

◇: Velocity, level set　　O: Pressure　　•: Level set on fine mesh

◇: Velocity, level set　　O: Pressure　　•: Level set on fine mesh

◇: Velocity, level set    O: Pressure    •: Level set on fine mesh

◇: Velocity, level set    O: Pressure    •: Level set on fine mesh

◇: Velocity, level set   ●: Level set

☐ : Time-centered edge velocities obtained from a Taylor's Expansion

✗ : Time-centered edge velocities which cannot be obtained from a Taylor's Expansion ×: Velocity  O: Pressure  •: Level set on fine mesh $t = t_0$  $t = t_1$  $t = t_2$  $t = t_3$  $t = t_4$  $t = t_5$

ODD TIMES REFINED QUADRILATERAL MESH FOR LEVEL SET

RELATED APPLICATIONS

This application is related to: U.S. patent application Ser. No. 10/390,239, filed on Mar. 14, 2003, and entitled "Coupled Quadrilateral Grid Level Set Scheme for Piezoelectric Ink-Jet Simulation;" U.S. patent application Ser. No. 10/729,637, filed on Dec. 5, 2003, and entitled "Selectively Reduced Bi-Cubic Interpolation for Ink-Jet Simulations on Quadrilateral Grids;" and U.S. patent application Ser. No. 11/398,775, filed on Apr. 6, 2006, entitled; "Local/Local and Mixed Local/Global Interpolations with Switch Logic." The disclosures of these three applications are hereby incorporated by reference herein in their entirety.

BACKGROUND OF THE INVENTION

1. Field of the Invention

The present invention relates to systems and methods for modeling, simulating and analyzing the motion of two fluids and the interface between those fluids using the level set method.

2. Description of the Related Art

An ink-jet print head is a printing device which produces images by ejecting ink droplets onto a print medium. Control of the ink ejection process and the ensuing ink droplet is essential to ensuring the quality of any product created by the print head. To achieve such control it is important to have accurate and efficient simulations of the printing and ejection process. Simulating this process includes modeling of at least two fluids (i.e., ink and air) and the interface between these fluids. Prior art methods have used computational fluid dynamics, finite element analysis, finite difference analysis, and level set methods to model this behavior.

The level set method though useful sometimes has problems with mass conservation. Mass conservation refers to the ability of a simulation method to maintain, for a closed system, the mass of the simulated system. Similarly, for an open system, any masses added or subtracted should be reflected in the simulated mass of the system. Prior art methods have addressed the issue of mass conservation by periodically re-distancing the level set or using finer meshes for the entire simulation.

While using finer meshes does improve the mass conservation of the simulation, it also leads to a tremendous increase in the time and the resources required of the simulation. For example, if we started with an n×m mesh for a two-dimensional simulation. We would have to store 2×n×m velocities, n×m pressures, and n×m level sets. To enforce the fluid incompressibility, we have to solve a linear system with an n×m by n×m coefficient matrix. If we use a twice finer mesh for all the variables, we have to store 2×2n×2m velocities, 2n×2m pressures, and 2n×2m level sets. We also have to solve a linear system with a 2n×2m by 2n×2m coefficient matrix. Thus, the storage requirements are quadrupled if the mesh is twice finer. In addition, we will have to solve a linear system with a coefficient matrix that contains four times as many nonzero elements. If a direct solver is used, a four times more populated coefficient matrix usually requires computation time that is 64 times longer. Furthermore, if an explicit time integration scheme is used then a time step that is four times smaller would be required. This would further increase the required computation time.

Therefore, what is needed is a simulation method that improves upon the mass conservation of the level set method without unduly burdening computational resources.

OBJECTS OF THE INVENTION

An object of the present invention is to improve upon the mass conservation of simulations that use the level set method while limiting the computation resources required of the simulation.

SUMMARY OF THE INVENTION

An embodiment of the present invention may be a system or method for simulating the motion of a first fluid, a second fluid and an interface between the first fluid and the second fluid. The fluid velocities and pressures of the first and second fluids are calculated at a first set of points on a first mesh at a first time step. The fluid velocities and pressures are representative of the movement of the first and second fluids at the first time step. The level set, representative of a position of the interface at the first time step, is calculated at a second set of points on a second mesh which is odd times finer than the first mesh. New fluid velocities and pressures of the first and second fluids are calculated at the first set of points at a second time step. The new fluid velocities and pressures are representative of new movement of the first and second fluids at a second time step. A new level set is calculated at the second set of points. The new level set is representative of a new position of the interface at the second time step.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

I. Introduction

Figure 1:
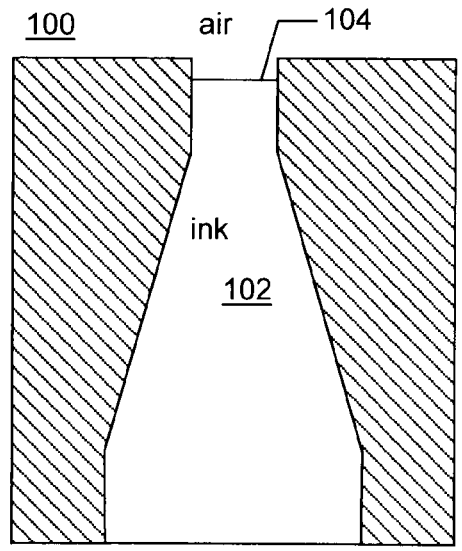
FIG. 1 illustrates a typical ink jet head nozzle which an embodiment of the invention may simulate.

FIG. 1 shows a typical ink jet print head nozzle 100 including ink 102 and an interface 104 between the ink 102 and the air. A pressure pulse may be applied to the ink 102 causing an ink droplet to be formed at the interface 104. The pressure pulse may be produced by applying a dynamic voltage to a piezoelectric (PZT) actuator which may be coupled to the ink 102 via a pressure plate i.e. a diaphragm.

When designing the print head nozzle 100 it is useful to simulate the production of ink droplets using computational fluid dynamics (CFD) code. The CFD code simulates production of ink droplets by solving a set of governing equations, (e.g., the incompressible Navier-Stokes equations for two-phase flows), for fluid velocity, pressure and interface position. The Navier-Stokes equations are exemplarily, other equations which describe the behavior of fluids or interfaces may also be used without changing the scope of the claimed invention.

Figure 2:
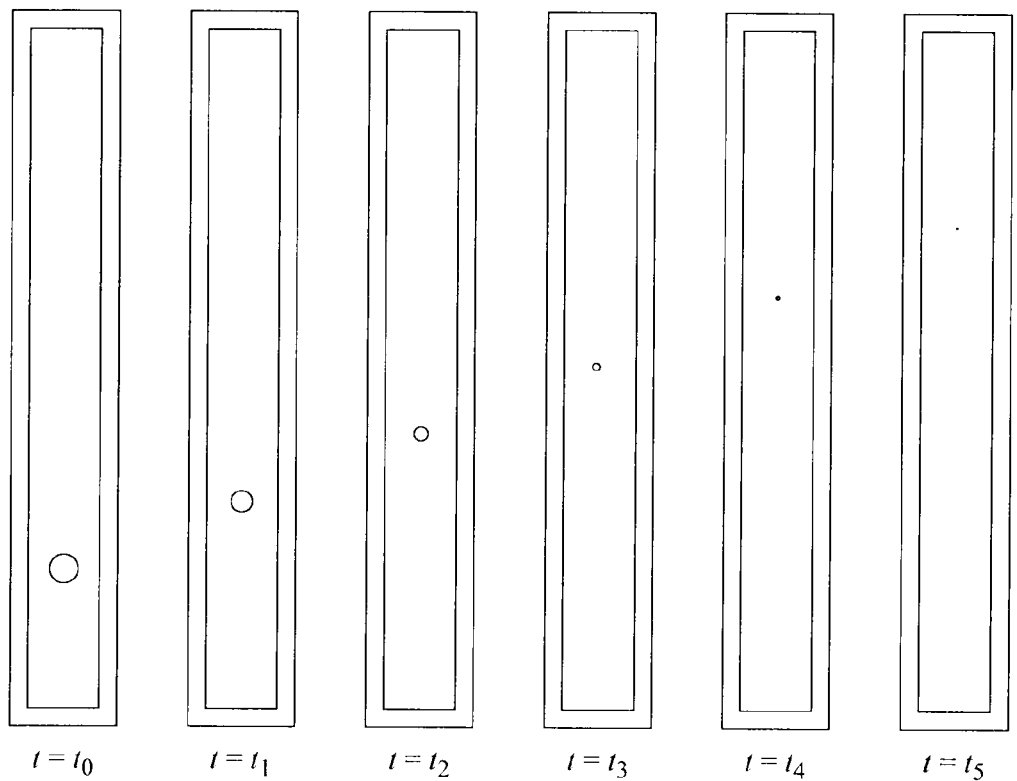
FIG. 2 illustrates the lack of mass conservation when simulating the motion of a droplet.

FIG. 2 is an illustration of the results of a numerical simulation as might be performed in the prior art. In this example, the motion of a circular ink droplet of radius 0.3 is surrounded by air in a cylindrical channel with radius of 3 and a length of 20. At an initial time $t_0$, the velocity is 1, the density ratio is 877, the dynamic viscosity ratio is 208, the Reynolds number is 30.0, the Weber number is 31.3, the inflow pressure and the outflow pressure are set to zero. This simulation is performed on a uniform 30×200 square mesh and is used to calculate the velocities, pressures and the level set which describe the behavior of the ink droplet. The time step is taken to be $\Delta t=0.002$. The level set is re-initialized every 60 time steps. FIG. 2 shows the initial time step $t_0$ and the results from the simulation at several subsequent time-steps ($t_1$, $t_2$, $t_3$, $t_4$ and $t_5$). The results of this simulation show a droplet whose size is decreasing and whose mass is not being conserved. Evaporation is not included in this model. Therefore, the shrinking of this droplet is an artifact of the simulation. An object of the present invention is to reduce the appearance and effect of artifacts of this type.

Figure 3:
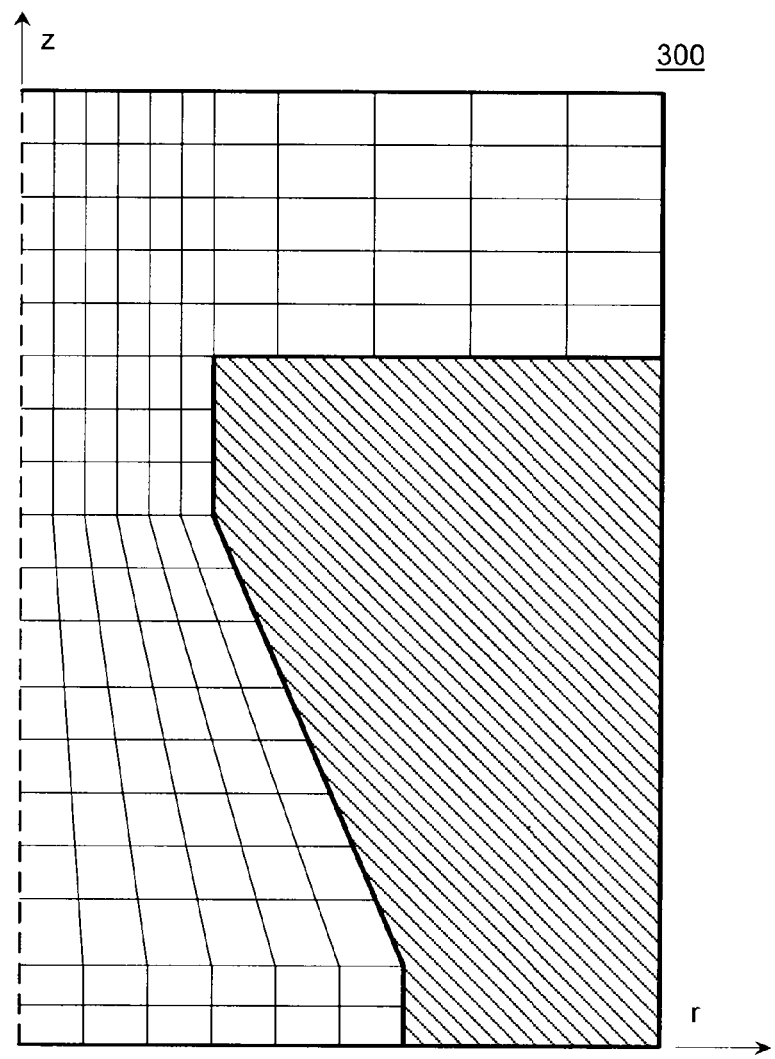
FIG. 3 illustrates a boundary-fitted quadrilateral mesh for ink-jet simulation.

FIG. 3 is an example of a body-fitted quadrilateral mesh 300 that the CFD code in an embodiment of the invention may use to represent the physical space in which the ink droplets are produced.

II. Governing Equations

Governing equations for two-phase flow include the continuity equation (1), the Navier-Stokes equations (2) and the level set convection equation (3), which are set forth in the Appendix along with the other numbered equations referenced in the following discussion. In these equations, u is a velocity vector, t is time, $\rho$ is the relative density, p is the pressure, $\mu$ is the relative dynamic viscosity, Re is the Reynolds number, We is the Weber number, Fr is the Froude number, $\kappa$ is the curvature, $\delta$ is the Dirac delta function and D is the rate of deformation tensor. The relative density $\rho$, the relative dynamic viscosity $\mu$, and the curvature $\kappa$ are all defined in terms of the level set function $\phi$.

Figure 4:
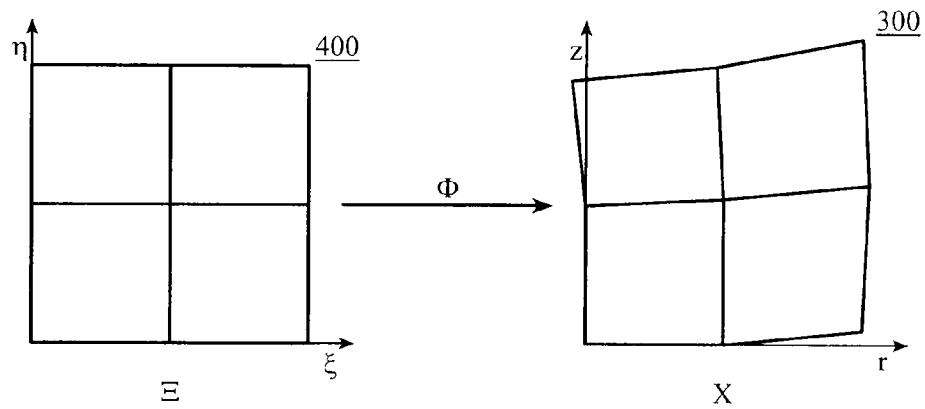
FIG. 4 illustrates a transformation $\Phi$ of mesh points in a rectangular computational space $\Xi$ to a physical axisymmetric space X.

The typical print head nozzle 100 is rotationally symmetric. Therefore, it is advantageous to model the print head nozzle 100 in a cylindrical coordinate system. It is reasonable to assume that the results will be independent of the azimuth. Therefore, the model can be reduced from three dimensions to two dimensions of an axially symmetric physical space, X(r, z). The body-fitted quadrilateral mesh 300 is created in this physical space, X. As illustrated in FIG. 4 this physical space X can be transformed via a transformation $\Phi$ which maps the mesh points in the physical space X to a computational space $\Xi=(\xi, \eta)$ and a rectangular mesh 400. Finite difference analysis may be used to solve the governing equations on the mesh 400 in this computational space $\Xi$. The Jacobian (4) and the transformation matrix (5) of this transformation $\Phi$ can be found in the Appendix. For cylindrical coordinate systems $g=2\pi r$. Evaluating the continuity equation (1), the Navier-Stokes equations (2) and the level set convection equation (3) in the computational space $\Xi$ involves transforming equations (1), (2) and (3) into equations (6) with the help of the Jacobian (4) and the transformation matrix (5). The second term of equation (2) is the viscosity term. Equation (7) is the viscosity term when evaluated in the computational space $\Xi$.

III. Numerical Algorithm:

A numerical algorithm is formulated on the quadrilateral mesh 300. In the following, the superscript n (or n+1) denotes the time step. Given quantities $u^n$, $p^n$, and $\phi^n$ the purpose of the algorithm is to obtain $u^{n+1}$, $p^{n+1}$, and $\phi^{n+1}$ which satisfy the governing equations. An embodiment of the invention may include an algorithm which is first-order accurate in time and second-order accurate in space. The invention is not limited to including algorithms of this accuracy but may include other formulations.

A. Spatial Discretization

As seen in FIG. 4 the transformation $X=\Phi(\Xi)$ is such that a computational mesh 400 in the computational space may be composed of unit squares, $\Delta\xi=\Delta\eta=1$, or a rectangular mesh. The boundary-fitted quadrilateral mesh and the nozzle wall in FIG. 3 are mapped to the uniform computational mesh 400 with unit squares.

Figure 5:
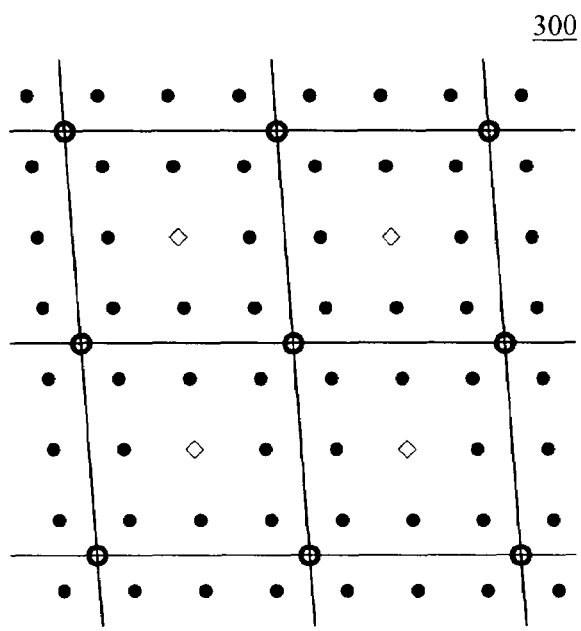
FIG. 5 illustrates relative mesh points at which variables are calculated on a quadrilateral mesh in the physical axisymmetric space X.

Throughout the following discussion variables are calculated on nodes and edges of one or more meshes. The relative position of nodes is represented by pairs of variables either in parentheses or as subscripts $(Z(x, y) \leftrightarrow Z_{x,y})$ FIG. 5 illustrates a portion of the quadrilateral mesh 300. As shown in FIG. 5 at integer time steps the pressure $p^n(i, j)$ is calculated at nodes of the quadrilateral mesh 400. Also at integer time steps velocity components $u^n(i, j)$ are calculated at the center of each cell in the quadrilateral mesh 300. The level set values $\phi^n$ are calculated on an odd times finer mesh than the quadrilateral mesh 400.

The pressure is calculated on a first mesh. The velocity is calculated on a second mesh which is offset from the first mesh. The second mesh is offset such that each node in the second mesh is in the center of four nodes of the first mesh. The level set values are calculated on a third mesh. A third mesh is odd times finer (3, 5, 7, 9, etc.) than the second mesh and the first mesh. A subset of nodes of the third mesh are aligned with nodes of the second mesh.

Figure 6A:
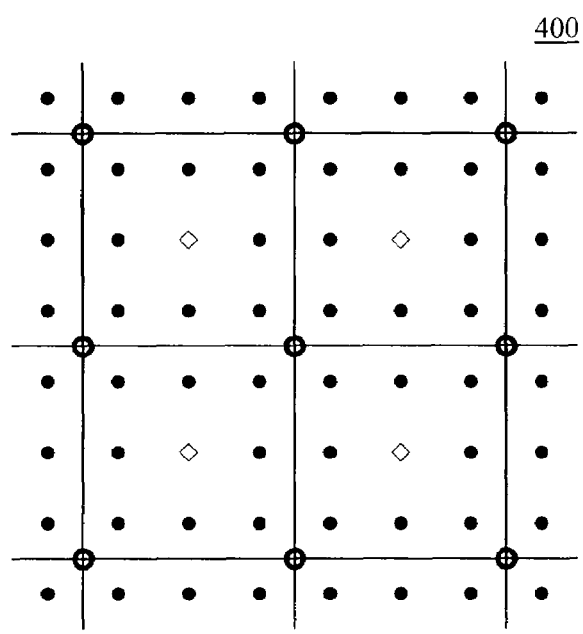
FIGS. 6A-6C illustrates relative mesh points at which variables are calculated on a rectangular mesh in the computational space $\Xi$.
Figure 6B:
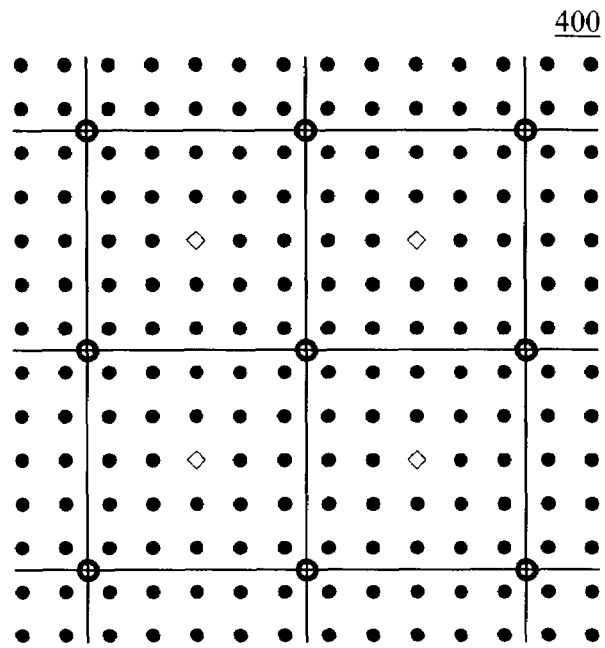
Figure 6C:
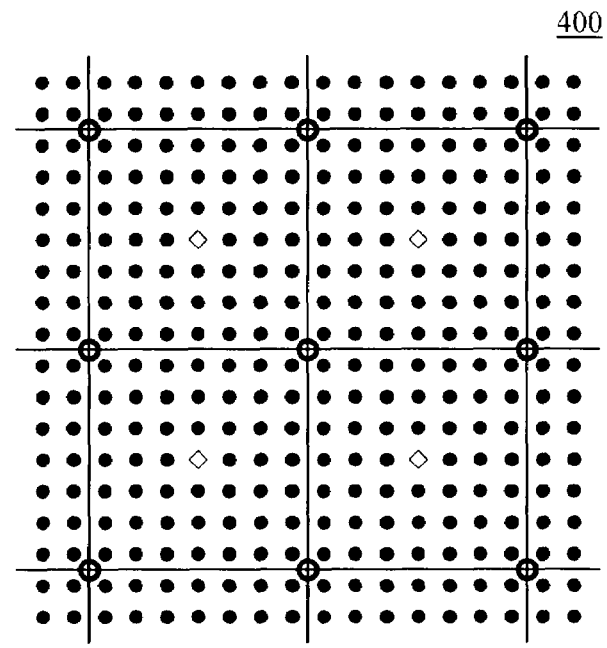

FIG. 6A illustrates a portion of the uniform mesh 400, wherein the level set $\phi^n$ is calculated on a three times refined mesh. FIG. 6B illustrates a portion of the uniform mesh 400, wherein the level set $\phi^n$ is calculated on a five times refined mesh. FIG. 6C illustrates a portion of the uniform mesh 400, wherein the level set $\phi^n$ is calculated on a seven times refined gird.

Note that only the local definition of the transformation (or mapping) is needed in the algorithm. The existence or the exact form of the global transformation $X=\Phi(\Xi)$ is not important. The Jacobians (4) and the transformation matrices (5) should be calculated for both the regular mesh and the odd times finer mesh.

B. Smearing of the Interface

In a typical system the densities and the viscosities of both fluids are very different. The abrupt change in density and viscosity across the interface 104 may cause difficulties in simulation. Therefore, this abrupt change may be replaced by a smoothed function. The smoothing may occur in a region of space with a thickness of $2\epsilon$ centered on the interface 104. Thus $\epsilon$ is representative of the extent of smearing of the interface 104. An example of such a smoothed function is a smoothed Heavyside function (8). A typical value for $\epsilon$ may be proportional to 1.7 to 2.5 times the average size of a quadrilateral cell in mesh 300. In addition, the derivative of the smoothed function may be defined as a delta function as illustrated in equation (8).

C. Level Set, Velocity Field and Pressure Field Update

The interface 104 is represented by a zero level set $\Gamma$ of a level set function $\phi$. The level set function $\phi$ is initialized as a signed distance to the interface 104, i.e., the level set value is the shortest distance to the interface 104 on the ink 102 side and is the negative of the shortest distance on the air side. The level set function $\phi$ is calculated at each node in the third mesh.

The level set function $\phi^{n+1}$ may be updated using equation (9) which may be derived from the level set convection equation ($\phi_t + u \cdot \nabla \phi = 0$) as illustrated in equation (9). The time-centered advection term in equation (9) may be evaluated using an explicit predictor-corrector scheme that only requires data available at time $t^n$.

To update the velocity vector, an intermediary value $u^*$ may be first calculated using equation (10) which may be derived from equation (6). After which a pressure field $p^{n+1}$ may be calculated using equation (11). A new velocity vector field $u^{n+1}$ may be calculated using equation (12).

D. Re-Initialization of the Level Set

To correctly capture the interface 104 and accurately calculate the surface tension, the level set needs to be maintained as a signed distance function to the interface 104. However, if the level set is updated by equation (9), it will not remain as such. Therefore, the simulation is periodically stopped and a new level set function $\phi$ is recreated.

E. The Advection Term

The advection term may be calculated using a cell-centered predictor-corrector scheme. Which may be based on an unsplit second-order Godunov method described by John B. BELL et al., in "*A Second-order Projection Method for Variable-Density Flows,*" Journal of Computational Physics, 101, pp. 334-348, 1992, for two-phase (two constant densities) flows.

Equation (13) is the corrector step used to calculate the time-centered advection term found in equation (9). For a three times refined mesh, the constants a and b may take on the values of (1, 0 and −1). It would be obvious to someone skilled in the art to modify equation (13) to describe an odd times refined mesh such as 5, 7 or 9 times refined mesh.

Figure 7:
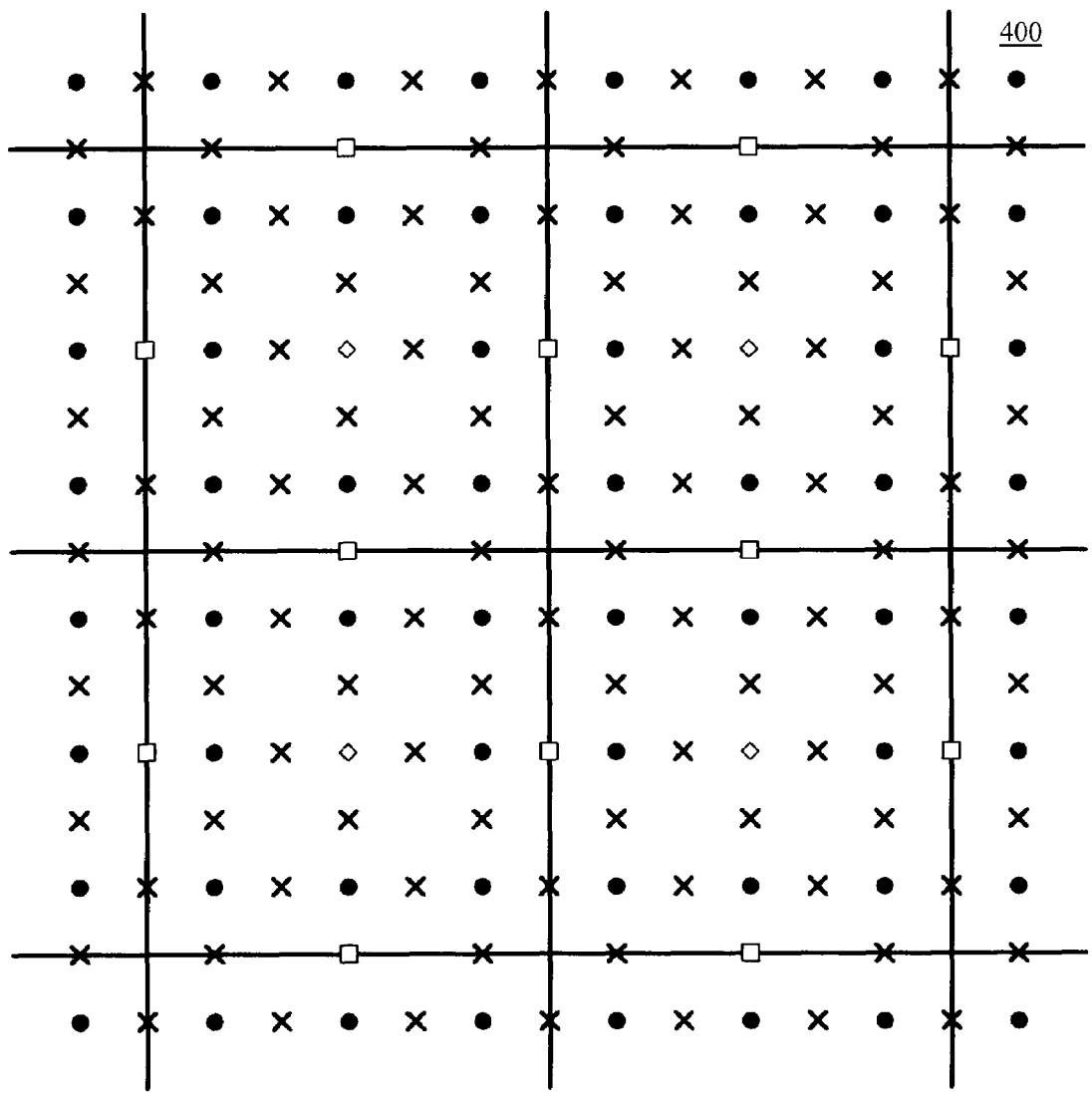
FIG. 7 illustrates relative mesh points at which variables are calculated on a rectangular mesh in the computational space $\Xi$.

FIG. 7 illustrates relative positions of level set values $\phi^n$, velocities $u^n$, time centered level set values $\phi^{n+1/2}$ and time centered edge velocities $u^{n+1/2}$ on a portion of the uniform mesh 400, and a three times refined mesh. Equation (13) is an example of how the time centered advection term from equation (9), may be calculated on a 3 times refined mesh.

The time centered edge velocities and the time centered edge level sets may be obtained via a judicious combination of a Taylor expansion in space and time and an upwinding scheme. FIG. 7 illustrates the locations of the time centered edge velocities on the computational mesh 400. The level set convection equation may be used as a substitute for a time derivative of the level set $\phi_t^n$. Extrapolation is done from both sides of the odd times refined mesh and then Godunov type upwinding is used to choose which extrapolation result to use.

The term $\phi^{n+1/2}(i+a/3+\frac{1}{6}, j+b/3)$ is calculated using the following method. Extrapolating from the left yields equation (14). Extrapolating from the right yields equation (15).

Evaluation of the normal level set derivatives in the computational space {e.g., $\phi_\Xi^n(i+a/3, j+b/3)$, $\phi_\eta^n(i+a/3+\frac{1}{3}, j+b/3)$, $\phi_\eta^n(i+a/3, j+b/3)$ and $\phi_\eta^n(i+a/3, j+b/3+\frac{1}{3})$,}, may be done using a monotonicity-limited central difference method. The transverse derivative term {e.g., $(\bar{v}\phi_\eta)^n(i+a/3, j+b/3)$ and $(\bar{u}\phi_\Xi)^n(i+a/3, j+b/3)$} may be evaluated using an upwind scheme.

Obtaining the normal derivatives involves calculating the central, forward and backward differences (16). A limiting derivative is defined in equation (17). The second-order limited derivative is given in equation (18). The tangential derivatives may be calculated using an upwinding scheme. Equation (19) is one method that may be used to calculate the tangential derivative.

It may not be practical to use a Taylor expansion to evaluate the time centered advective flux at all the necessary points. This is because the velocity u at any particular time step $t_n$ is defined only at cell centers of the basic mesh as shown in FIGS. 5, 6A-6C. Thus, a Taylor expansion will only give time centered velocities at cell edges of the basic mesh. Instead a distance weighted local average is used to calculate the time centered advective velocities as shown in equations (20). The obtained advective velocities are then used to calculate the advective fluxes at edges of the finer mesh, as shown in equation (21). These advective fluxes may be used in a Godunov upwinding scheme to decide which time-centered edge level set values (from (13) and (14)) to retain, as illustrated in equation (22).

III. Flowchart

Figure 8:
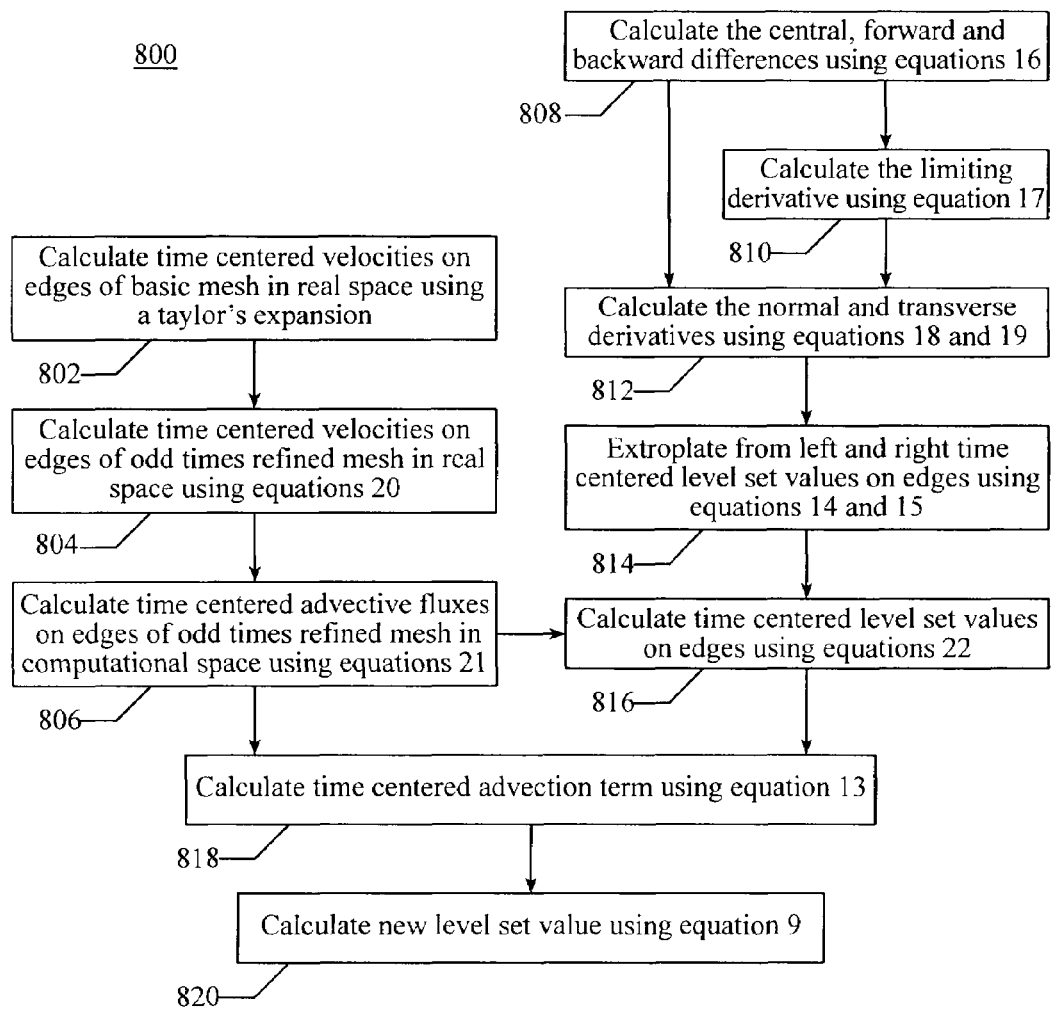
FIG. 8 is a flow chart illustrating some of the steps involved in simulating the motion of a droplet.

FIG. 8 is a flowchart 800 which illustrates how new level set values $\phi^{n+1}$ may be calculated on the odd times finer mesh. As illustrated in FIG. 5 the velocity $u^n$ of a fluid at time step n may be calculated on the second mesh which is offset from a first mesh on which the pressure $p^n$ of a fluid at time step n has been calculated. Calculating a new level set value $\phi^{n+1}$ may require the calculation of time centered edge velocities. If the level set values were calculated on an odd times finer mesh then, the time centered edge velocities may also need to be calculated on the odd times finer mesh. The time centered edge velocities may be calculated on the basic mesh in a step 802. This may be done using a Taylor's expansion and Godunov upwinding. The time centered edge velocities on the basic mesh may then be used to calculate time centered edge velocities on the odd times finer mesh, which may be calculated using a first order distance weighted local average of two to four of the nearest neighbors using equation (20) in a step 804. The time centered edge fluxes on the odd times finer mesh may then be calculated using equation (21) in a step 806.

Calculating the new level set value $\phi^{n+1}$ may involve the calculation of intermediary values which will aid in the calculation of the new level set value $\phi^{n+1}$. For example the central, forward and backward differences of the level set along a first axis of the computational mesh on the refined mesh may be calculated using equation (16) in a step 808. The forward difference at a particular node is the difference between a level set value of the nearest neighboring node in the positive direction along a first axis and the level set value at a particular node. The backward difference at a particular node is the difference between a level set value at a particular node and a level set value of the nearest neighboring node in the negative direction along the first axis. The central difference is half the difference between the nearest neighbor in the positive direction along the first axis and a level set value of the nearest neighboring node in the negative direction along the first axis. It would be obvious to someone skilled in the art to calculate the backward, forward and central differences along a second axis of the computational mesh.

The forward and backward differences may be used to calculate a limiting derivative of the level set along a first axis of the computational space at nodes of the refined mesh using equation (17) in a step 810. If the forward and backward differences at a particular node have opposite signs or at least one of them is zero, then the limiting derivative is equal to zero. Otherwise, the limiting derivative is equal to twice the absolute value of either the forward difference or the backward difference whichever is smaller.

The limiting derivative and the central difference may be used to calculate a second order limited derivative of the level set along a first axis of the computational space at a particular node of the refined mesh using equation (18) in a step 812. The first axis may correspond to a radial direction in the real space. The lesser of the limiting derivative or the absolute value of the central difference may be multiplied by the sign of the central difference to produce the second order limited derivative.

The tangential derivative term may be calculated using equation (19) in the step 812. The second axis of the computational space may be related to the axial axis of the real space. If the velocity along the second axis at the particular node is greater than zero then the tangential derivative term may be set to the velocity along the second axis times the difference between the level set value at the particular node and a neighboring node in a negative direction along the second axis. If the velocity along the second axis at the particular node is less than zero then the tangential derivative term may be set to the velocity along the second axis times the difference between the level set value at a neighboring node in a positive direction along the second axis and the level set value at the particular node.

The left and right time centered level set values on vertical edges of the refined mesh may be calculated using equations (14) and (15) in a step 814. Equation (14) is an extrapolation from the left, while equation (15) is an extrapolation from the right.

The time centered level set values on edges of the refined mesh may be calculated using equation (22) in a step 816. If the normal advective flux at a particular edge is greater than zero then the time centered level set value at the particular edge may be set to the left time centered level set value at the particular edge. If the normal advective flux at a particular edge is less than zero then the time centered level set value at the particular edge may be set to the right time centered level set value at the particular edge. If the velocity at a particular edge is zero then the time centered level set value at the particular edge may be set to the average of both the left and the right time centered level set values at the particular edge. It would be obvious to someone skilled in the art to calculate time centered level set value on an edge orthogonal to the particular edge.

The time centered advection term on nodes of the refined mesh in the computational space may be calculated using equation (13) in a step 818. Equation (13) may be a high ordered differencing of the time centered advection term. The new level set value on nodes of the refined mesh in the computational space may be calculated using equation (9) in a step 820.

All of the values above may be calculated ahead of time or as needed. These values may be calculated for all edges of the refined mesh or may only be calculated for edges near the interface. Higher order approximations of the equations described above may be used to calculate the values described above without falling outside the spirit and scope of the appended claims.

IV. Evenly Refined Meshes

Figure 9:
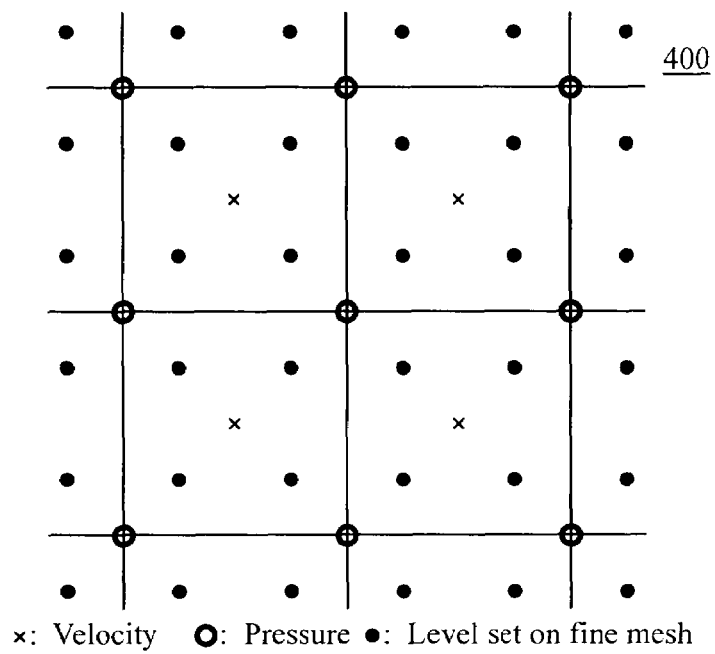
FIG. 9 illustrates relative mesh points at which variables are calculated on a rectangular mesh in the computational space $\Xi$.

FIG. 9 illustrates a basic computational mesh 400 in which the level set values ϕ are calculated on a cell centered twice refined mesh. Locations for the velocities on the basic mesh are marked by hollow circles and locations for the level set values ϕ are marked by solid dots. None of the level set values ϕ are co-located with the velocities. The level set values ϕ on evenly refined meshes may be updated using equations similar to the equations used to update the level set values ϕ on an odd times refined mesh. Since none of the velocities are co-located with the level set values ϕ. All the velocity values used in calculating the new level set values will need to be calculated by averaging the velocities on the basic mesh before doing Taylor's expansion. This introduces numerical viscosity, reduces mesh resolution and lowers simulation accuracy. Using a three times refined mesh as in an embodiment of the present invention, every one level set value ϕ out of nine is co-located with the velocities on the basic mesh.

V. Simulation Results

Figure 10:
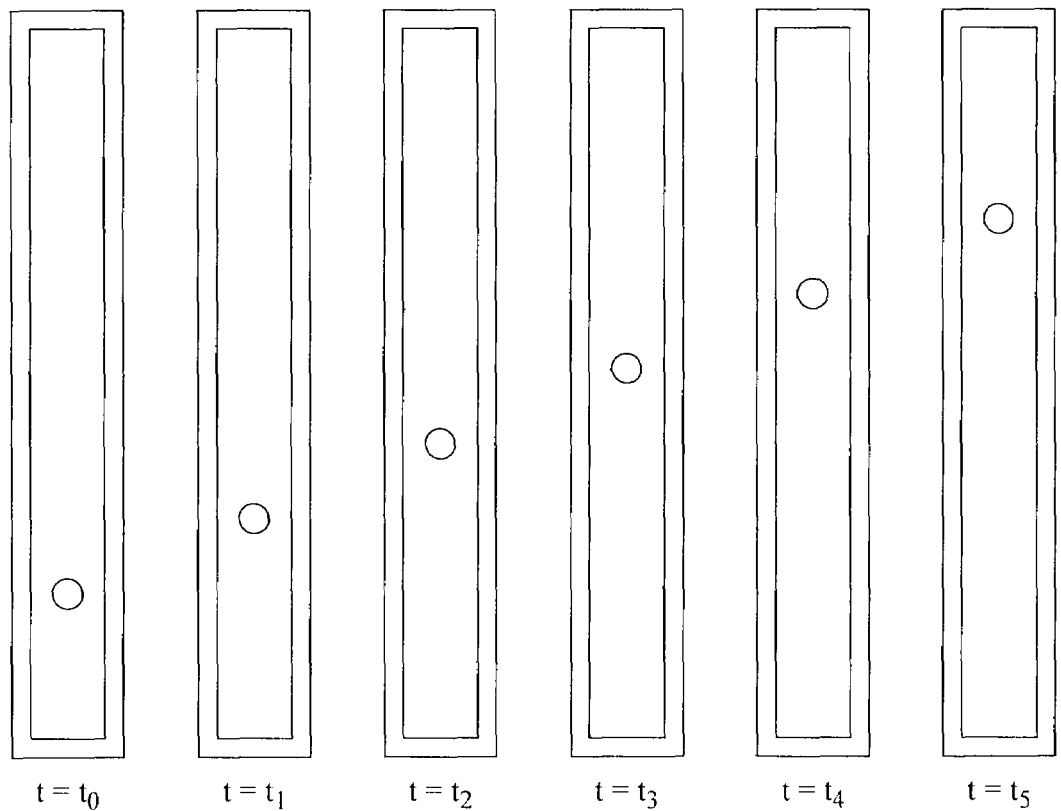
FIG. 10 illustrates simulation results of the motion of a droplet as might be produced by an embodiment of the present invention.

FIG. 10 is an illustration of the results of a numerical simulation as might be performed by an embodiment of the present invention. In this example, the motion of a circular ink droplet of radius 0.3 is surrounded by air in a cylindrical channel with radius of 3 and a length of 20. At an initial time $t_0$, the velocity is 1, the density ratio is 877, the dynamic viscosity ratio is 208, the Reynolds number is 30.0, the Weber number is 31.3, the inflow pressure and the outflow pressure are set to zero. This simulation was performed on a uniform 30×200 square mesh. This mesh was used to calculate the velocities and pressures. The odd times finer mesh for the level set is 90×600. The time step is taken to be $\Delta t=0.002$. The level set is re-initialized every 60 time steps. FIG. 10 shows the initial time step $t_0$ and the results from the simulation at several subsequent time-steps ($t_1$, $t_2$, $t_3$, $t_4$, and $t_5$). The results of this simulation show a droplet whose size does not change by a significant amount. Thus, mass conservation in this simulation is significantly increased without significantly increasing the required computational resources.

VI. System

Figure 11:
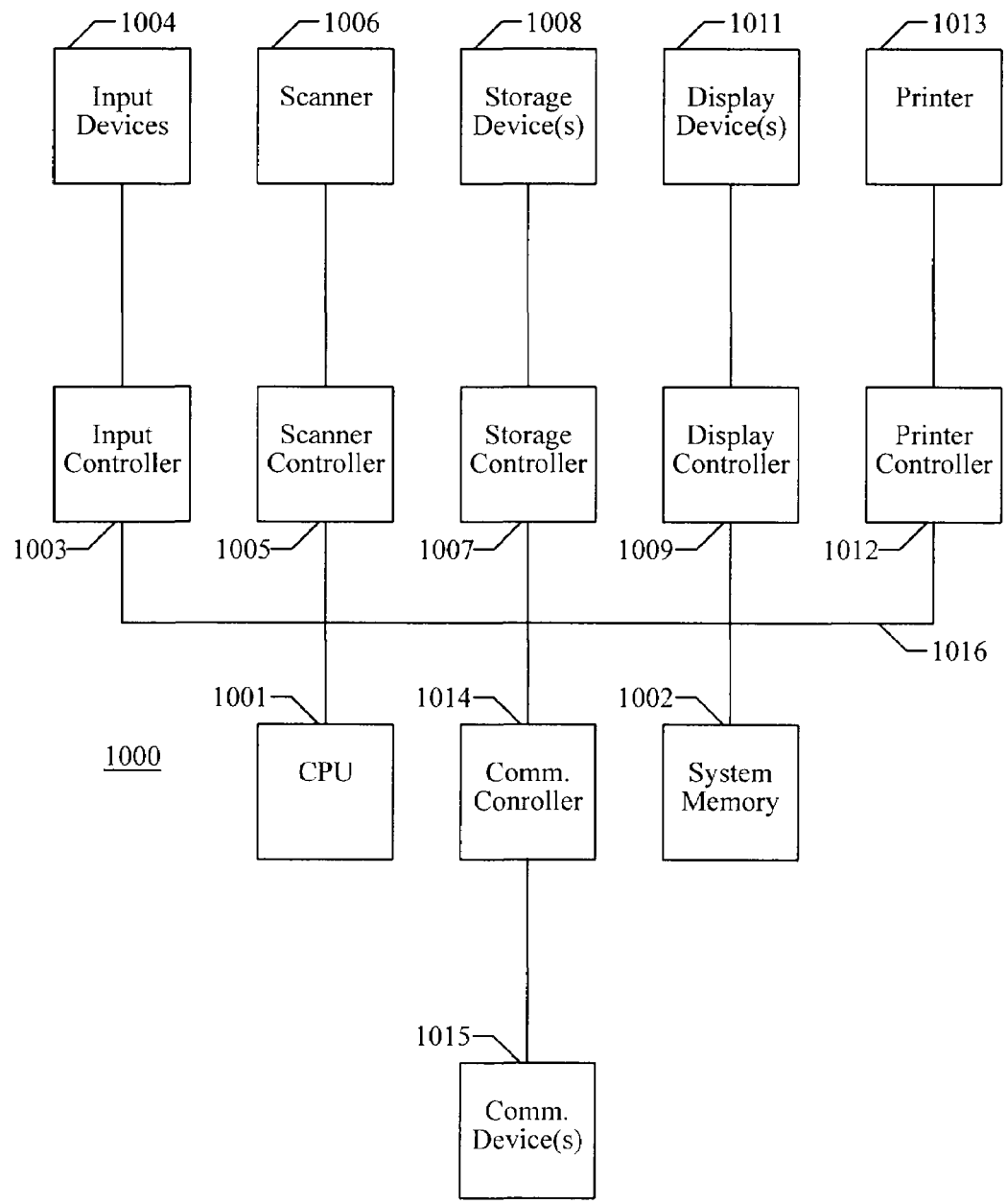
FIG. 11 is a block diagram illustrating an exemplary system which may be used to implement aspects of the present invention.

Having described the details of the invention, an exemplary system 1000 which may be used to implement one or more aspects of the present invention will now be described with reference to FIG. 11. As illustrated in FIG. 10, the system includes a central processing unit (CPU) 1001 that provides computing resources and controls the computer. The CPU 1001 may be implemented with a microprocessor or the like, and may also include a graphics processor and/or a floating point coprocessor for mathematical computations. The system 1000 may also include system memory 1002 which may be in the form of random-access memory (RAM) and read-only memory (ROM).

A number of controllers and peripheral devices may also be provided, as shown in FIG. 10. An input controller 1003 represents an interface to various input device(s) 1004, such as a keyboard, mouse or stylus. There may also be a scanner controller 1005 which communicates with a scanner 1006. The system 1000 may also include a storage controller 1007 for interfacing with one or more storage devices 1008 each of which includes a storage medium such as magnetic tape or disk, or an optical medium that might be used to record programs of instructions for operating systems, utilities and applications which may include embodiments of programs that implement various aspects of the present invention. Storage device(s) 1008 may also be used to store processed data or data to be processed in accordance with the invention. The system 1000 may also include a display controller 1009 for providing an interface to a display device 1011 which may be a cathode ray tube (CRT) or a thin film transistor (TFT) display. The system 1000 may also include a printer controller 1012 for communicating with a printer 1013. A communications controller 1014 may interface with one or more communication devices 1015 which enables the system 1000 to connect to remote devices through any of a variety of networks including the Internet, a local area network (LAN), a wide area network (WAN), or through any suitable electromagnetic carrier signals including infrared signals.

In the illustrated system, all major system components may connect to a bus 1016 which may represent more than one physical bus. However, various system components may or may not be in physical proximity to one another. For example, input data and/or output data may be remotely transmitted from one physical location to another. Also, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

The present invention may be conveniently implemented with software. However, alternative implementations are certainly possible, including a hardware implementation or a software/hardware implementation. Any hardware-implemented functions may be realized using ASIC(s), digital signal processing circuitry, or the like. Accordingly, the "means" terms in the claims are intended to cover both software and hardware implementations. Similarly, the term "machine-readable medium" as used herein includes software, hardware having a program of instructions hardwired thereon, or a combination thereof. With these implementation alternatives in mind, it is to be understood that the figures and accompanying description provide the functional information one skilled in the art would require to write program code (i.e., software) or to fabricate circuits (i.e., hardware) to perform the processing required.

In accordance with further aspects of the invention, any of the above-described methods or steps thereof may be embodied in a program of instructions (e.g., software) which may be stored on, or conveyed to, a computer or other processor-controlled device for execution. Alternatively, any of the methods or steps thereof may be implemented using functionally equivalent hardware (e.g., application specific integrated circuit (ASIC), digital signal processing circuitry, etc.) or a combination of software and hardware.

VI. Conclusion

While the invention has been described in conjunction with several specific embodiments, further alternatives, modifications, variations and applications will be apparent to those skilled in the art in light of the foregoing description. Examples of such alternatives, among others include: higher dimensions; alternate coordinate systems; alternate fluids; alternate boundary conditions; alternate channels; alternate governing equations; alternate numerical approximations; and systems with more than two fluids. Thus, the invention described herein is intended to embrace all such alternatives, modifications, variations and applications as may fall within the spirit and scope of the appended claims.

APPENDIX $$\nabla \cdot u = 0. \tag{1}$$

$$\frac{Du}{Dt} = -\frac{1}{\rho(\phi)} \nabla p + \frac{1}{\rho(\phi)\mathrm{Re}} \nabla \cdot (2\mu(\phi)\mathcal{D}) - \frac{1}{\rho(\phi)We} \kappa(\phi)\delta(\phi)\nabla\phi - \frac{1}{Fr} e_z. \tag{2}$$

$$\frac{\partial \phi}{\partial t} + (u \cdot \nabla)\phi = 0. \tag{3}$$

$$J = g \det \nabla_\Xi \Phi = g \det \begin{pmatrix} r_\xi & r_\eta \\ z_\xi & z_\eta \end{pmatrix}. \tag{4}$$

$$T = g^{-1} J [\nabla_\Xi \Phi]^{-1} = \begin{pmatrix} z_\eta & -r_\eta \\ -z_\xi & r_\xi \end{pmatrix}. \tag{5}$$

$$\nabla_\Xi \cdot \bar{u} = 0, \bar{u} = gTu, \tag{6}$$

$$\frac{\partial u}{\partial t} + J^{-1}(\bar{u} \cdot \nabla_\Xi) u =$$

$$-\frac{1}{\rho(\phi)J} g T^T \nabla_\Xi p + (\text{Viscosity term}) - \frac{1}{Fr} e_z -$$

$$\frac{g\delta(\phi)}{J^2 \rho(\phi) We} \nabla_\Xi \cdot \left( gT \frac{T^T \nabla_\Xi \phi}{|T^T \nabla_\Xi \phi|} \right)(T^T \nabla_\Xi \phi), \frac{\partial \phi}{\partial t} + J^{-1} \bar{u} \cdot \nabla_\Xi \phi = 0.$$

$$(\text{Viscosity term}) = \tag{7}$$

$$\frac{g}{J\rho(\phi)\mathrm{Re}} [T^T \nabla_\Xi \mu(\phi)] \cdot \left[ g J^{-1} T^T \nabla_\Xi u + (g J^{-1} T^T \nabla_\Xi u)^T \right] +$$

$$\frac{\mu(\phi)}{J\rho(\phi)\mathrm{Re}} \nabla_\Xi \cdot \{g^2 J^{-1} T T^T \nabla_\Xi u\} + \frac{\mu(\phi)}{\rho(\phi)\mathrm{Re}} \begin{pmatrix} -\frac{u}{r^2} \\ 0 \end{pmatrix}.$$

$$H(\phi) = \begin{cases} 0 & \text{if } \phi < -\epsilon \\ \frac{1}{2}\left[1 + \frac{\phi}{\epsilon} + \frac{1}{\pi}\sin(\pi\phi/\epsilon)\right] & \text{if } |\phi| \le \epsilon, \delta(\phi) = \frac{dH(\phi)}{d\phi}. \\ 1 & \text{if } \phi > \epsilon \end{cases} \tag{8}$$

$$\phi^{n+1} = \phi^n - \frac{\Delta t}{J} [\bar{u} \cdot \nabla_\Xi \phi]^{n+1/2}. \tag{9}$$

$$u^* = u^n + \Delta t \left\{ -J^{-1} [(\bar{u} \cdot \nabla_\Xi) u]^{n+1/2} + \right. \tag{10}$$

$$\left. (\text{Viscosity term})^n + (\text{Surface tension})^{n+1/2} - \frac{1}{Fr} e_2 \right\}.$$

$$\nabla_\Xi \cdot (gTu^*) = \nabla_\Xi \cdot \left( \frac{g^2 \Delta t}{\rho(\phi^{n+1/2}) J} T T^T \nabla_\Xi p^{n+1} \right). \tag{11}$$

$$u^{n+1} = u^* - \frac{g\Delta t}{\rho(\phi^{n+1/2}) J} T^T \nabla_\Xi p^{n-1}. \tag{12}$$

$$[(\bar{u} \cdot \nabla_\Xi)\phi]_{i+a/3, j+b/3}^{n+1/2} = \tag{13}$$

$$\frac{\bar{u}_{i+a/3+1/6, j+b/3}^{n+1/2} + \bar{u}_{i+a/3-1/6, j+b/3}^{n+1/2}}{2} (\phi_{i+a/3+1/6, j+b/3}^{n+1/2} - \phi_{i+a/3-1/6, j+b/3}^{n+1/2}) +$$

$$\frac{\bar{v}_{i+a/3, j+b/3+1/6}^{n+1/2} + \bar{v}_{i+a/3, j+b/3-1/6}^{n+1/2}}{2}$$

$$(\phi_{i+a/3, j+b/3+1/6}^{n+1/2} - \phi_{i+a/3, j+b/3-1/6}^{n+1/2}), \quad a, b = 1, 0, -1.$$

-continued $$\phi_{i+a/3+1/6,j+b/3}^{n+1/2,L} = \phi_{i+a/3,j+b/3}^n + \frac{1}{2}\phi_{\xi,i+a/3,j+b/3}^n + \frac{\Delta t}{2}\phi_{t,i+a/3,j+b/3}^n \quad (14)$$

$$= \phi_{i+a/3,j+b/3}^n + \left(\frac{1}{2} - \frac{\Delta t}{2J_{i+a/3,j+b/3}}\overline{u}_{i+a/3,j+b/3}^n\right)$$

$$\phi_{\xi,i+a/3,j+b/3}^n - \frac{\Delta t}{2J_{i+a/3,j+b/3}}(\overline{v}\phi_\eta)_{i+a/3,j+b/3}^n,$$

$a, b = 1, 0, -1.$ $$\phi_{i+a/3+1/6,j+b/3}^{n+1/2,R} = \phi_{i+a/3+1/3,j+b/3}^n - \frac{1}{2}\phi_{\xi,i+a/3+1/3,j+b/3}^n + \frac{\Delta t}{2}\phi_{t,i+a/3+1/3,j+b/3}^n \quad (15)$$

$$= \phi_{i+a/3+1/3,j+b/3}^n - \left(\frac{1}{2} + \frac{\Delta t}{2J_{i+a/3+1/3,j+b/3}}\overline{u}_{i+a/3+1/3,j+b/3}^n\right)$$

$$\phi_{\xi,i+a/3+1/3,j+b/3}^n - \frac{\Delta t}{2J_{i+a/3+1/3,j+b/3}}(\overline{v}\phi_\eta)_{i+a/3+1/3,j+b/3}^n,$$

$a, b = 1, 0, -1.$ $$D_\xi^c(\phi^n)_{i+a/3,j+b/3} = (\phi_{i+a/3+1/3,j+b/3}^n - \phi_{i+a/3-1/3,j+b/3}^n)/2, \quad (16)$$

$$D_\xi^+(\phi^n)_{i+a/3,j+b/3} = (\phi_{i+a/3+1/3,j+b/3}^n - \phi_{i+a/3,j+b/3}^n),$$

$$D_\xi^-(\phi^n)_{i+a/3,j+b/3} = (\phi_{i+a/3,j+b/3}^n - \phi_{i+a/3-1/3,j+b/3}).$$

$$\delta_{lim}(\phi^n)_{i+a/3,j+b/3}^n = \quad (17)$$

$$\begin{cases} \min(2|D_\xi^-(\phi^n)_{i+a/3,j+b/3}|, & \text{if } (D_\xi^-(\phi^n)_{i+a/3,j+b/3}) \\ 2|D_\xi^+(\phi^n)_{i+a/3,j+b/3}|) & (D_\xi^+(\phi^n)_{i+a/3,j+b/3}) > 0 \\ 0 & \text{otherwise,} \end{cases}$$

$$(\phi_\xi^n)_{i+a/3,j+b/3} = \min(|D_\xi^c(\phi^n)_{i+a/3,j+b/3}|, \delta_{lim}(\phi^n)_{i+a/3,j+b/3}) \times \quad (18)$$

$$\text{sign}(D_\xi^c(\phi^n)_{i+a/3,j+b/3}), \quad a, b = 1, 0, -1.$$

$$(\overline{v}\phi_\eta)_{i+a/3,j+b/3}^n = \max(\overline{v}_{i+a/3,j+b/3}^n, 0)(\phi_{i+a/3,j+b/3}^n - \phi_{i+a/3,j+b/3-1/3}^n) + \quad (19)$$

$$\min(\overline{v}_{i+a/3,j+b/3}^n, 0)(\phi_{i+a/3,j+b/3+1/3}^n - \phi_{i+a/3,j+b/3}^n), \quad a, b = 1, 0, -1.$$

$$u_{i+a/6,j+b/3}^{n+1/2} = \quad (20)$$

$$\frac{3+a}{6}\left(\frac{2}{3}u_{i+1/2,j}^{n+1/2} + \frac{1}{3}u_{i+1/2,j+b}^{n+1/2}\right) + \frac{3-a}{6}\left(\frac{2}{3}u_{i-1/2,j}^{n+1/2} + \frac{1}{3}u_{i-1/2,j+b}^{n+1/2}\right),$$

$a = 3, 1, -1, -3,$
$b = 1, 0, -1,$ $$v_{i+a/3,j+b/6}^{n+1/2} =$$

$$\frac{3+b}{6}\left(\frac{2}{3}v_{i,j+1/2}^{n+1/2} + \frac{1}{3}v_{i+a,j+1/2}^{n+1/2}\right) + \frac{3-b}{6}\left(\frac{2}{3}v_{i,j-1/2}^{n+1/2} + \frac{1}{3}v_{i+a,j-1/2}^{n+1/2}\right),$$

$a = 1, 0, -1,$
$b = 3, 1, -1, -3.$ $$\overline{u}_{i+a/6,j+b/3}^{n+1/2} = g_{i+a/6,j+b/3}T_{i+a/6,j+b/3}u_{i+a/6,j+b/3}^{n+1/2}, \quad (21)$$

$a = 3, 1, -1, -3, b = 1, 0, -1,$ $$\overline{u}_{i+a/3,j+b/6}^{n+1/2} = g_{i+a/3,j+b/6}T_{i+a/3,j+b/6}u_{i+a/3,j+b/6}^{n+1/2},$$

$a = 1, 0, -1, b = 3, 1, -1, -3.$ $$\phi_{i+a/6,j+b/3}^{n+1/2} = \begin{cases} \phi_{i+a/6,j+b/3}^{n+1/2,L} & \text{if } \overline{u}_{i+a/6,j+b/3}^{n+1/2} > 0 \\ \phi_{i+a/6,j+b/3}^{n+1/2,R} & \text{if } \overline{u}_{i+a/6,j+b/3}^{n+1/2} < 0 \\ \frac{\phi_{i+a/6,j+b/3}^{n+1/2,L} + \phi_{i+a/6,j+b/3}^{n+1/2,R}}{2} & \text{if } \overline{u}_{i+a/6,j+b/3}^{n+1/2} = 0, \end{cases} \quad (22)$$

$a = 3, 1, -1, -3, b = 1, 0, -1.$

What is claimed is:

1. A process of simulating motion of a first fluid, a second fluid and an interface between the first fluid and the second fluid comprising the steps of:

calculating fluid velocities and pressures of the first and second fluids at a first set of nodes on a first mesh at a first time step, representative of movement of the first and second fluids at the first time step;

calculating a level set, representative of a position of the interface at the first time step, at a second set of nodes on a second mesh which is odd times finer than the first mesh;

calculating a central difference of the level set on the second set of nodes along a first axis;

calculating a forward difference of the level set on the second set of nodes along the first axis;

calculating a backward difference of the level set on the second set of nodes along the first axis;

calculating a limiting derivative of the level set on the second set of nodes along a first axis;

calculating a second order limiting derivative on the second set of nodes along a first axis;

calculating a tangential derivative term on a second set of nodes along a second axis;

calculating new fluid velocities and pressures of the first and second fluids at the first set of nodes at a second time step, representative of new movement of the first and second fluids at a second time step; and calculating a new level set at the second set of nodes, representative of a new position of the interface at the second time step.

2. The process of claim 1, wherein the second mesh is three times finer than the first mesh.

3. The process of claim 1, wherein calculation of the fluid velocities and pressures is done with a finite difference method.

4. The process of claim 1, wherein the first fluid is ink and second fluid is air.

5. The process of claim 1, wherein the motion simulated includes a portion of the first fluid being ejected from a nozzle.

6. The process of claim 1, wherein the first and second meshes are quadrilateral meshes in a physical space.

7. The process of claim 6, further comprising a step of:
mapping the first and second meshes from the physical space to a computational space in which the first and second meshes are rectangular.

8. The process of claim 7, further comprising the step of calculating and storing at the beginning of the process two sets of transformation matrices and Jacobians for the first mesh and the second mesh for mapping the physical space to the computational space.

9. The process of claim 1, wherein the motion of the fluids are simulated in a 3-dimensional coordinate system.

10. The process of claim 9, wherein the coordinate system is an axially symmetric coordinate system, and angular motion along the azimuth is not simulated.

11. The process of claim 1, wherein the fluid velocities are calculated at the center of the first mesh, the pressures are calculated at nodes of the first mesh, and the level set is calculated at the nodes of the second mesh.

12. The process of claim 1, further comprising, calculation of edge velocities on edges of the second mesh at a half time step, the half time step is halfway between the first and second time step, the edge level set values are calculated using a Taylor's expansion for edges of the second mesh that coincide with edges of the first mesh and a distance weighted average for edge velocities on the second mesh.

13. A machine-readable medium encoded with a computer program comprising a set of instructions for directing an apparatus to perform the process of claim 1.

* * * * *